TELEPHONE CENTRAL OFFICE LOOP-AROUND TEST SECURITY CIRCUIT

Filed April 15, 1965 3 Sheets-Sheet 1

INVENTORS H. W. EARLE
V. E. MUNSON

BY [signature]

ATTORNEY

TELEPHONE CENTRAL OFFICE LOOP-AROUND TEST SECURITY CIRCUIT

Filed April 15, 1965 3 Sheets-Sheet 2

Feb. 27, 1968 H. W. EARLE ET AL 3,371,165

TELEPHONE CENTRAL OFFICE LOOP-AROUND TEST SECURITY CIRCUIT

Filed April 15, 1965 3 Sheets-Sheet 3

United States Patent Office 3,371,165
Patented Feb. 27, 1968

3,371,165
TELEPHONE CENTRAL OFFICE LOOP-AROUND TEST SECURITY CIRCUIT

Harold W. Earle, New Shrewsbury, and Verne E. Munson, Manasquan, N.J., assignors to Bell Telephone Laboratories, Incorporated, New York, N.Y., a corporation of New York

Filed Apr. 15, 1965, Ser. No. 448,401
10 Claims. (Cl. 179—175.3)

Figure 1:
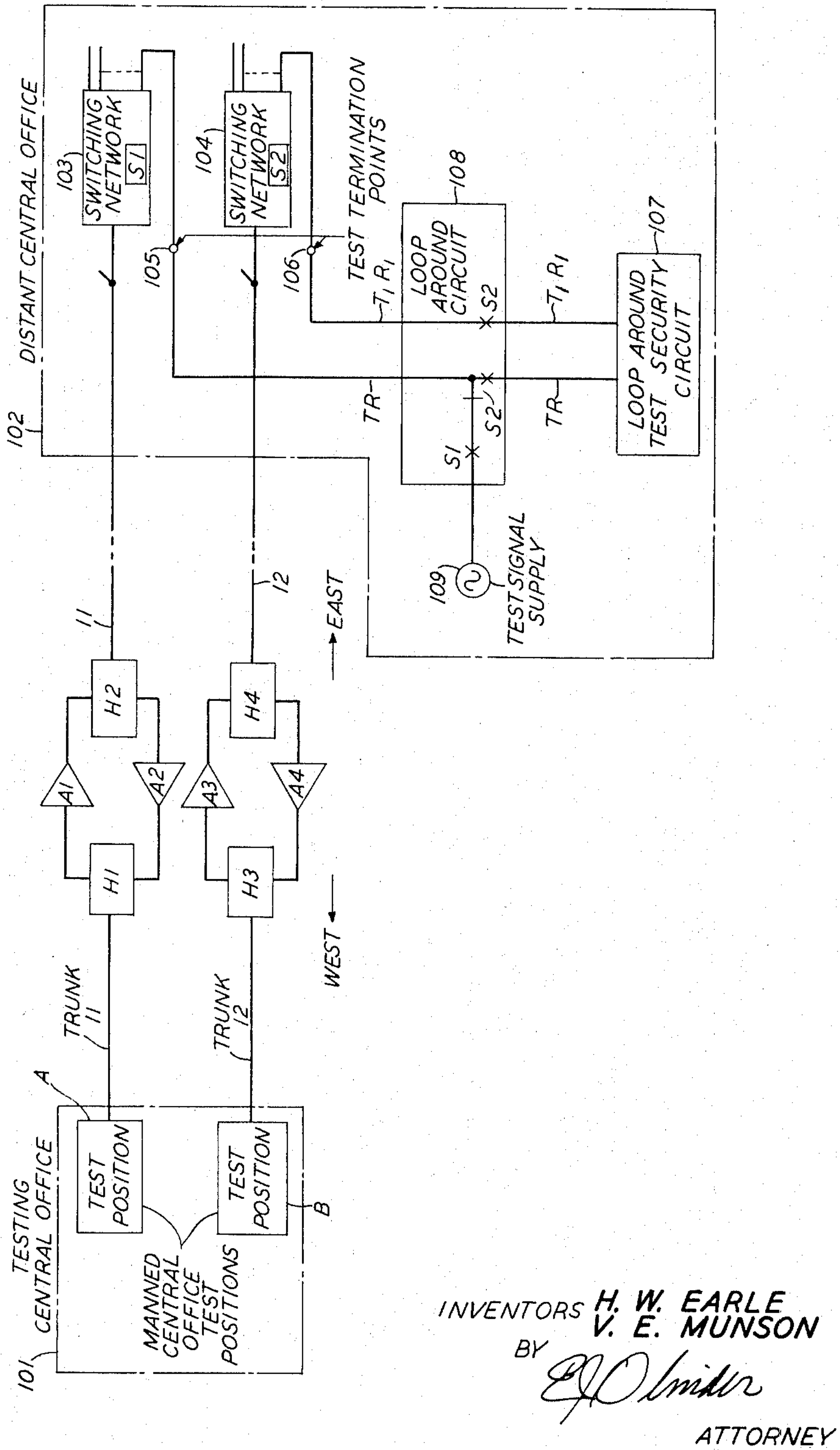

This invention relates in general to communication transmission networks and more particularly to systems for testing a two-way telephone transmission channel to determine the transmission loss in both directions.

In order to ensure the consistently high transmission quality that marks modern telephone communication, frequent measurements of transmission losses must be made and evaluated with a minimum interruption of service. Systems are known, as disclosed, for example, by A. L. Bonner in U.S. Patent 2,666,099, that furnish a relatively simple and effective means for measuring transmission losses on the telephone communication channels provided by central office trunks. Such losses must be measured in both directions of transmission inasmuch as intermediate portions of central office trunks may take the form of four-wire systems, carrier or noncarrier, with separated repeater paths for each transmission direction.

In accordance with conventional practice, it is possible for a single test operator in a central office to take the two-way transmission loss measurements indicated. Such action is made possible by means of a "loop-around" connection in which a transmission loop between two trunks is completed at the distant central office in response to the test operator at the near central office dialing each of two corresponding codes or telephone numbers. By transmitting a tone test signal around the loop from the testing end and by subsequently automatically triggering a tone signal generator at the distant central office, which tone is applied to the trunk under test, the transmission loss in each of the two directions of transmission may readily be determined.

In completing a transmission test loop in the fashion indicated, a normal transmission path, suitable for either signaling or talking, is completed between each of two test termination points at the distant central office. Despite all reasonable efforts to restrict information as to the code identity of such test points to authorized operating personnel, breaches of this security have been known to occur. As a result, it has on occasion been possible for each of two unauthorized persons dialing from respective subscriber stations to be interconnected with a talking path through a pair of common central office termination test points. Toll can be avoided in this manner inasmuch as such connections are not normally made a part of the automatic message accounting (AMA) system.

Accordingly, one object of the invention is to preclude the unauthorized use of certain telephone central office facilities.

Another object of the invention is to reduce interference with toll trunk testing facilities.

A further object is to prevent the unauthorized avoidance of telephone charges.

These and other objects are achieved in accordance with the principles of the invention by providing a first additional switching means for closing a loop-around test circuit responsive to a test signal level detecting circuit in combination with a test signal level rejection filter followed by a second level detector circuit that is operatively responsive to speech or other unwanted signals. A dual function second switching means such as a relay, for example, operatively responsive to the output of the detector, opens the loop-around test circuit and inhibits the operation of the first switching means. Consequently, the presence of speech or other unwanted signals on a transmission path completed by the connection of two test termination points in a central office results in opening the transmission path. Thus, through application of the principles of the invention, the use of such a transmission path is denied to unauthorized persons who seek to avoid legitimate toll charges.

Accordingly, one feature of this invention is a telephone central office circuit that completes a loop-around test path in response to a tone of preselected frequency above a preselected level that is applied to that path.

Another feature is a circuit in combination with the circuit indicated in the previously described feature that opens a central office loop-around test path in response to speech on the loop that exceeds some preselected level.

A further feature is a circuit in combination with the circuits indicated in the two previously described features that inhibits the operation of the first circuit in response to speech signals on the loop-around path that exceed a preselected level irrespective of the presence of a tone signal on the loop-around path.

Figure 2:
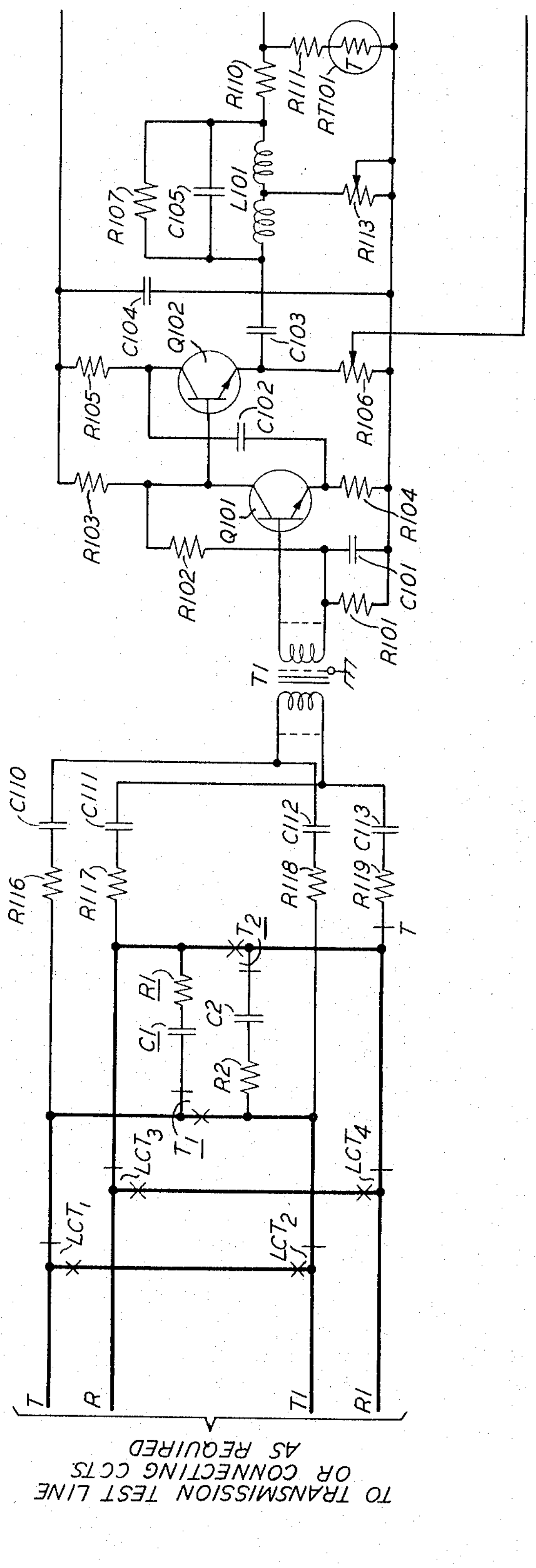
Figure 3:
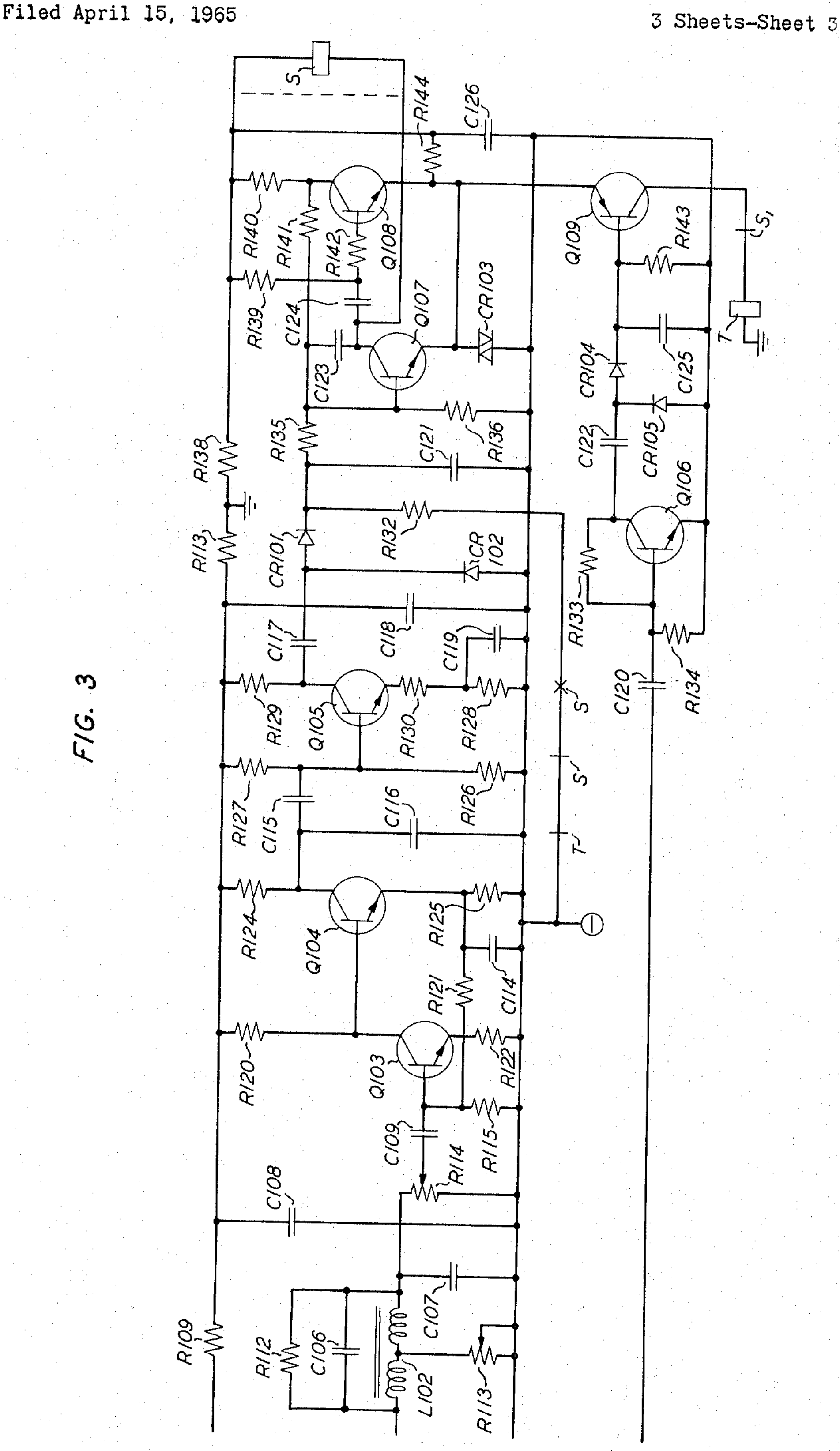

The principles of the invention as well as additional objects and features will be fully apprehended from the following detailed description of an illustrative embodiment thereof together with the appended drawing in which:

FIG. 1 is a block diagram of a loop-around test circuit in accordance with the invention; and FIGS. 2 and 3 together present a schematic circuit diagram of the loop-around test security circuit shown in block form in FIG. 1.

FIG. 1 illustrates a complete loop-around test circuit in order to facilitate a full understanding of the environment in which a loop-around test security circuit in accordance with the invention may be utilized. A testing central office 101 is shown connected to a distant central office 102 by means of a first trunk 11 which includes a two-way transmission network comprising hybrids H1 and H2 and amplifiers A1 and A2. Similarly, central offices 101 and 102 are connected by a second trunk 12 which includes hybrid networks H3 and H4 and amplifiers A3 and A4. The testing central office 101 requires an operator to supervise test positions A and B. Distant central office 102, which does not require direct operator supervision, includes switching networks 103 and 104, test termination points 105 and 106, a loop-around circuit including make contacts S1, and make and make-break contacts S2 and a test signal source 109. The general relation of a loop-around test security circuit with respect to conventional loop-around test circuitry is shown by block 107.

A test to determine trunk transmission loss is initiated by the transmission of a suitable dial signal from test position A at central office 101 which dial signal is transmitted on trunk 11 to switching network 103. Switching network 103 completes a connection through to test termination point 105. Additionally, switching network 103 by the operation of switch S1 operates make contacts S1, thereby applying a tone signal from test signal supply source 109 to the conducting path through switching network 103 to amplifier A2 back to test position A. It is assumed that the level of the test signal from source 109 is known. Accordingly, the difference between the transmitted level of that tone and the level received at test position A is a measure of the transmission loss on trunk 11 in the east to west direction.

To measure the loss on trunk 11 in the west to east direction, dial signals corresponding to test termination point 105 are sent from test position A and dial signals corresponding to test termination point 106 are transmitted from test position B. The resulting operation of both switches S1 and S2 completes a loop-around path by way of leads T1R1 and TR, through loop-around test circuit 107. At that point a test tone from a source, not shown, at test position A is applied to trunk 11. The loop-around path described above results in the return of the test position A tone on trunk 12 in the east to west direction to test position B. Assuming that the transmission loss on trunk 12 in the east to west direction is known, by measurement of a tone from test signal supply 109 in the manner described previously for trunk 11, the loss in the west to east direction on trunk 11 may readily be calculated.

As evident from the foregoing description, it is clear that unauthorized persons utilizing dial signals corresponding to test termination points 105 and 106 may be connected together with a talking path, thus providing a means for the avoidance of proper toll charges. Connections of that type may readily be prevented through the utilization of a loop-around test security circuit in accordance with the invention. Such a circuit is shown as block 107 in FIG. 1 and is shown in schematic circuit diagram form in FIGS. 2 and 3.

Broadly, the circuit shown in FIGS. 2 and 3 provides facilities for detecting a test signal such as a 1,000 c.p.s. tone, for example, and means for closing the loop-around path when the test tone on either line exceeds some preselected level such as —15 dbm. Additionally, the circuit includes a means for opening the loop-around path or more specifically a means for inserting a relatively high loss therein upon detection of any signal (such as speech) other than the 1,000 c.p.s. test tone that falls within the voice frequency range and that exceeds a second preselected level such as —45 dbm, for example.

A complete description of the circuit shown in FIGS. 2 and 3 may best be presented in terms of the operation thereof. In the stand-by condition, with no test signal present on either line, relays T and S, FIG. 3, are both released and the bridging circuit comprising resistors R116 through R119 and C110 through C113 introduces a relatively high loss such as 85 db, for example, to impede any unauthorized transmission. Suitable terminating impedance for line TR is provided by resistor R1 and capacitor C1 and for line T1R1 by resistor R2 and capacitor C2. A 1,000 c.p.s. test signal appearing on either line (TR or T1R1) above —15 dbm is transmitted through the bridging circuit to the input side of transformer T1. From the output of transformer T1 the signal is applied to the base of amplifying transistor Q101. The output of transistor Q101 is in turn applied to the base of transistor Q102 providing a second stage of amplification. The emitter output of transistor Q102 is applied by way of variable resistor R106 and capacitor C120 (FIG. 3) to the base of transistor Q106. The output from transistor Q106 is applied by way of capacitor C122 to diode CR104 which rectifies the amplified signal. The positive A-C voltage across capacitor C125 is applied to the base of transistor Q109. When the voltage across capacitor C125 exceeds some preselected level such as 1.5 volts, for example, transistor Q109 is forward-biased sufficiently to operate relay T. The line signal level required for operating relay T is determined by adjusting the tone control variable resistor R106 (FIG. 2).

Relay T, through the operation of make and break contacts $T_1$, disconnects the line termination elements capacitors C1 and resistor R1 from leads T and R. Similarly, the operation of transfer contacts $T_2$ disconnects the line termination elements resistor R2 and capacitor C2 from leads T1 and R1. Lead T is connected to lead T1 through make contact $T_1$ and lead R is connected to lead R1 through make contact $T_2$ thus permitting transmission of the 1,000 c.p.s. test tone. Relay T remains operated as long as the tone is present unless speech or other signals outside of a preselected frequency band appear.

An alternate path for incoming signals is provided at the emitter output of transistor Q102. Specifically, signals are applied to a dual notch filter network which includes resistor R107, capacitor C105, inductor L101, resistor R110, resistor R112, capacitor C106 and inductor L102. The function of the filter is to reject the 1,000 c.p.s. test signal, permitting the transmission of speech or other out-of-band signals. The notch filters described are highly selective and provide a high level (for example 50 db) of rejection over the desired frequency range.

Accordingly, if speech signals appear on the line above some preselected level in the presence of the 1,000 c.p.s. test tone, the signals are transmitted, as previously described, through the bridging circuit to input transformer T1, are amplified by transistors Q101 and Q102 and then transmitted through the notch filters which remove the 1,000 c.p.s. signal. The remaining signal is further amplified by transistors Q103, Q104 and Q105 and is rectified by diodes CR101 and CR102 to trigger a monostable multivibrator comprising transistors Q107 and Q108. The output of this multivibrator operates relay S. The speech level required to operate relay S is determined by adjusting a sensitivity control which is provided by variable resistor R114.

In further detail, when the D-C voltage across capacitor C121 exceeds some preselected level such as 1.5 volts, for example, transistor Q107 conducts to operate relay S. The drop in the collector voltage of transistor Q107 is transmitted as a negative pulse by capacitor C124 to the base of transistor Q108 by way of resistor R142. Transistor Q108 is thereby turned off and remains nonconducting for some preselected period, such as three seconds for example, until capacitor C124 discharges through resistor R139. During the period that transistor Q108 is nonconducting, transistor Q107 is held in a conducing forward-biased state by current flowing through resistor R141. After the three-second delay indicated, transistor Q108 starts to conduct and the bias current through resistor R141 from the collector of transistor Q108 to the base of transistor Q107 reverses polarity to turn transistor Q107 off, thereby releasing relay S. If a speech signal is still present on the line, however, the resulting positive voltage across caapcitor C121 holds transistor Q107 on until the speech level is reduced below some preselected magnitude, such as —45 VU. The operation of relay S disables and releases relay T by opening its operating path at break contact $S_1$. Relay T released opens the connection between leads T and T1 at make contact $T_1$ and opens the connection between leads R and R1 at make contact $T_2$. Resistor R1 and capacitor C1 are again connected as a terminating network across leads T and R by the closing of the break contact $T_1$. Resistor R2 and capacitor C2 are again connected as a terminating network across leads T1 and R1 by the closing of break contact $T_2$. When relay S releases, relay T operates and, assuming that the 1,000 c.p.s. tone is still present, the transmission path is restored. Relay S operates to release relay T whenever speech or other signals outside of the notch filter limits appear on either line. If relay S operates, the transmission path is opened for some preselected minimum period, such as the three-second period indicated above. The attack time of the circuit is sufficiently rapid to prevent any intelligible speech above a preselected level, such as —45 VU. for example, from being transmitted in the presence of a legitimate tone signal.

In accordance with the invention, means are provided to bypass the entire loop-around test security circuit in the event that maintenance on the circuit is required or if transmission testing at frequencies other than the notch filter frequency is desired. A two-position manually operable key (not shown) is used to operate transfer contacts $LCT_1$ through $LCT_4$. With the operation of the loop cut-through key, the loop-around path is closed through the contacts indicated to remove the entire control circuit from the loop-around.

It is to be understood that the embodiment described herein is only illustrative of the principles of the invention. Various modifications may be effected by persons skilled in the art without departing from the spirit and scope of the invention.

What is claimed is:

1. Apparatus for testing two-way line transmission loss comprising, in combination, first and second transmission paths, means responsive to a tone signal on one of said paths for connecting said paths, and means responsive to speech signals on one of said paths for inserting a relatively high impedance between said paths.

2. Apparatus for testing two-way line transmission loss comprising, in combination, first and second transmission paths, first means responsive to a tone signal on one of said said paths for connecting said paths, and dual purposs switching means responsive to speech signals on one of said paths for disabling said first means and for inserting a relatively high impedance between said paths.

3. Apparatus, for testing two-way line transmission loss, comprising, in combination, first and second transmission paths having a relatively high impedance connected therebetween, means responsive to a tone signal on one of said paths for shunting said high impedance with a relatively low impedance path, and means responsive to speech signals on one of said paths for opening said low impedance path.

4. Apparatus for testing two-way line transmission loss comprising, in combination, first and second transmission paths having a relatively high impedance connected therebetween, first switching means responsive to a tone signal on one of said paths for shunting said high impedance with a relatively low impedance, and second switching means responsive to speech signals on one of said paths for opening said low impedance path.

5. Apparatus for testing two-way line transmission loss comprising, in combination, first and second transmission paths having a relatively high impedance connected therebetween, first switching means responsive to a tone signal on one of said paths of a preselected frequency and exceeding a preselected magnitude for shunting said high impedance with a relatively low impedance, and dual function switching means responsive to electrical signals, including speech signals but excluding said tone signal, on one of said paths for switching out said relatively low impedance and for disabling said first switching means irrespective of the presence of a tone signal on one of said paths.

6. Apparatus for testing two-way line transmission loss comprising, in combination, first and second transmission paths, relatively high impedance means normally bridged between said two paths, first amplifying means, means for applying a signal on either of said paths to said amplifying means, means for filtering the output of said amplifying means to block the further transmission of all signals of preselected frequency characteristics, second amplifying means for amplifying signals passed by said filtering means, means for rectifying the output of said second amplifying means, means responsive to the output of said second amplifying means for generating a first output signal, first switching means responsive to said first output signal for shunting said high impedance with a relatively low impedance path, means responsive to the unfiltered output of said first amplifying means for generating a second output signal, and second switching means responsive to said second output signal for disabling said first switching means, whereby said transmission paths are connected with a low impedance path in the presence of a signal having said preselected frequency characteristics and by a high impedance path only in the presence of signals other than said last named signal.

7. Apparatus in accordance with claim 6 wherein said first output signal generating means comprises a multivibrator.

8. Apparatus in accordance with claim 6 wherein said second output signal generating means comprises amplifying means and rectifying means.

9. Apparatus in accordance with claim 6 including manually operated switching means for shunting said low impedance path across said high impedance means.

10. Apparatus for disabling a telephone central office loop-around test path for the transmission of speech signals comprising, in combination, first and second transmission paths normally bridged by a high impedance path for blocking the transmission of speech signals, first switching means responsive to a test tone frequency signal on either of said transmission paths for shunting said high impedance path with a relatively low impedance path thereby to enable said loop-around test path for the transmission of test tone signals, and second switching means responsive to speech signals on either of said transmission paths for disabling said first switching means thereby to preclude speech transmission on said transmission paths.

No references cited.

KATHLEEN H. CLAFFY, *Primary Examiner.*

A. M. McGILL, *Assistant Examiner.*